United States Patent [19]
Bannister et al.

[11] 3,719,086
[45] March 6, 1973

[54] LIQUIDS SAMPLER WITH PROBE-BATHING CHAMBER

[75] Inventors: John D. Bannister; Joseph C. Peters; Michael Jordan, all of Needham Heights, Mass.

[73] Assignee: Damon Corporation, Needham Heights, Mass.

[22] Filed: Jan. 12, 1971

[21] Appl. No.: 105,803

[52] U.S. Cl. ................................................73/423 A
[51] Int. Cl. ................................................G01n 1/14
[58] Field of Search ......................................73/423 A

[56] References Cited

UNITED STATES PATENTS

| 3,266,322 | 8/1966 | Negersmith | 73/423 A |
| 3,552,212 | 1/1971 | Ohlin | 73/423 A |
| 3,252,330 | 5/1966 | Kling | 73/423 |

*Primary Examiner*—S. Clement Swisher
*Attorney*—Kenway, Jenney & Hildreth

[57] ABSTRACT

Clinical or like apparatus for introducing samples of liquids successively from plural liquid vessels into a conduit by means of a movable probe, has a probe-bathing fluid-containing system through which the probe slidably passes as it moves between the sampling and other positions. In the sampling position, the probe extends beyond the bathing container to immerse the probe inlet end in a vessel of sample liquid. The probe is retractable from this position to draw the probe inlet end into the bathing container, where it is immersed in a bath of liquid, typically for cleansing the probe and/or for the aspiration into the probe of the bathing liquid. Pneumatic sealing in the bathing container allows the probe to slide freely relative to it without leakage of the bathing liquid out of the container, and gas scavenging of the probe as it again passes out of the bathing container removes the bathing liquid from it, for preventing contamination of the sample liquids.

16 Claims, 6 Drawing Figures

INVENTORS
JOHN D. BANNISTER
JOSEPH PETERS
MICHAEL JORDAN

BY Kenway Jenney & Hildreth
ATTORNEYS

LIQUIDS SAMPLER WITH PROBE-BATHING CHAMBER

BACKGROUND

This invention relates to automated equipment for introducing a sample of liquid into a conduit from each of a succession of liquid containers. The invention is useful, for example, for introducing a sample of each of a plurality of biological liquids into an analyzer instrument that measures constituents of each liquid. Accordingly, the invention will be described with reference to use with such analysis equipment, although features of the invention can be used advantageously in other applications and in connection with other equipments.

In a liquids sampler of the present type, a probe is immersed in a first container of liquid to be sampled, and a sample of the liquid is aspirated into the probe. The probe is then withdrawn from the first container and, after an indexing movement to align a fresh, second container with the probe, the probe is immersed in the second container for aspirating a sample of the liquid in it. Unless the probe is thoroughly cleansed both on the outside and inside along the flow path along which the successive samples are drawn, the residue of one sample on the surfaces of the probe and sample conduit which it feeds will contaminate successive samples.

In addition to the requirement for cleansing the sampler between the aspiration of successive samples, it often is desired to introduce a liquid additive to each aspirated sample.

Numerous constructions are known in the prior art for fluid transferring devices which provide at least part of the foregoing functions. See, for example, U.S. Pat. Nos. 2,624,655; 3,134,263; 3,178,266; 3,230,776; and Re. 26,055; and the automatic carbon dioxide meter described in *Chemical Machinery*, by E. R. Riegel (Reinhold Pub. Co., 1944) pp. 548-9. However, to obtain the requisite sampler cleansing and the often desired addition of a further liquid to each sample, these prior samplers employ relatively complex mechanical mechanisms for moving the sampler probe and/or other sampler components, aside from the movement of fresh sample containers successively into position relative to the sampler probe. In addition, prior art samplers that operate with less complex movements generally require relatively complex valving or other control for the fluids being handled.

A further characteristic of some prior art samplers is that they are operated by the same mechanism that moves successive sample containers into position relative to the sampler. The resulting dependence of the sampler operation on the operation of the conveyor of sample containers is often unduly restrictive and hence undesirable.

Accordingly, it is an object of this invention to provide equipment for transferring samples of liquids into a conduit from plural liquid containers in succession and which operates both with a simple mechanical movement and with relatively simple fluid control.

Another object of the invention is to provide a liquids sampler of the above character which can operate with minimal dependence on, and with a mechanism independent from, the mechanism which moves successive containers of sample relative to the sampler.

A further object of the invention is to provide a sampler of the above character in which the only mechanical movement is a lineal reciprocation of the fluid-aspirating probe.

It is also an object of the invention to provide a sampler of the above character which aspirates a selected volume only of each sample and a selected volume of liquid additive and, further, which cleanses the probe with this liquid additive.

Another object of the invention is to provide a sampler of the above character having means for removing liquid from the probe exterior without mechanical contact with the probe.

A further object of the invention is to provide a sampler of the above character having means for sealing openings in a liquid chamber without mechanically sealing the openings.

Other objects of the invention will in part be obvious and will in part appear hereinafter.

SUMMARY OF THE INVENTION

A sampler embodying this invention has a fluid container with a bathing chamber, a fluid inlet passage feeding into the chamber, and at least one slide passage which also feeds into the chamber. A fluid outlet passage leads from the slide passage for removing fluids from it. The sampler has a sampling probe which is slidable in the slide passage between a probe-bathing position where the probe inlet aperture is within the bathing chamber, and a sampling position where the probe inlet aperture is outside of the chamber-housing container for immersion in a vessel carrying the liquid to be sampled.

In a typical operating sequence, the probe is moved to the sampling position and the desired volume of sample is aspirated into it. The probe is then withdrawn into the fluid container to bathe the probe inlet section with fluid in the bathing chamber. A measured volume of the bathing fluid is also aspirated into the probe for cleansing the sample flow path and, further, for diluting the sample just aspirated. Bathing fluid which flows into the slide passage is removed from it by way of the outlet passage. Further, air is drawn into the outlet passage from the slide passage for scavenging the probe dry when it again moves out of the bathing chamber for immersion into another vessel of liquid to be sampled. With this arrangement, the probe can move between the sampling and the bathing positions with only a simple lineal reciprocation, and the scavenging action in the slide passage both seals the bathing fluid from leakage out of the fluid container and dries the probe between successive immersions in the liquid-bearing vessels.

A further feature of the sampler is that the fluid container has a further slide passage on the other side of the bathing chamber and opposite the first slide passage. The probe passes slidably through this second slide passage also, and a second fluid outlet passage leads from this second slide passage to provide a pressure balance across the bathing chamber for minimizing flow of the bathing fluid from the bathing chamber into either slide passage section.

It is also preferable in accordance with this invention that the probe include a closed plug on the sample immersing end beyond the intake aperture. This plug is seated in a neck between the first slide passage and the bathing chamber when the probe is in the bathing position for restricting flow of the bathing fluid into the first slide passage. In addition, the probe plug enters a closely-fitting tubular portion on the preferred form of liquid-bearing vessel for enhancing the aspiration of a liquid sample free of denser sedimentary material which may also be present in the vessel. A sampler having these latter features preferably also allows the probe to descend to a sampling position which is dependent on the sediment level in the vessel being sampled.

The invention accordingly comprises the features of construction, combinations of elements, and arrangement of parts exemplified in the constructions hereinafter set forth, and further comprises the several steps and the relation of one or more of such steps with respect to each of the others according to which these elements and parts operate, and the scope of the invention is indicated in the claims.

BRIEF DESCRIPTION OF DRAWINGS

For a fuller understanding of the nature and objects of the invention, reference should be had to the following detailed description taken in connection with the accompanying drawings, in which.

DESCRIPTION OF ILLUSTRATED EMBODIMENT

Figure 1:
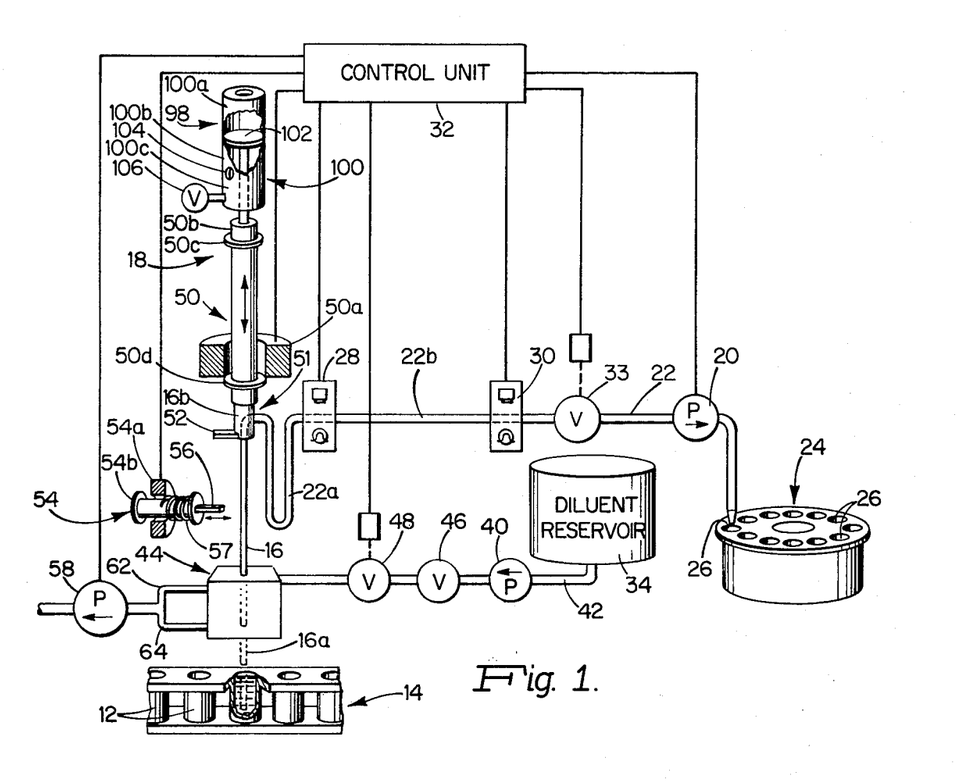
FIG. 1 is a schematic illustration, partly pictorial and partly in block form, of liquid-treating equipment having a sampler constructed in accordance with the invention.

With reference to FIG. 1, the illustrated liquid-treating equipment receives containers 12 of liquids to be treated on a conveyor 14 which advances incrementally to dispose the containers in succession under the probe 16 of sampler indicated generally at 18. A pump 20, preferably of the proportional type, is in the fluid path of a conduit 22 which carries samples from the probe 16 to a sample-treating reactor 24. The sampler 18, operating in conjunction with the pump 20, aspirates a sample of liquid from each container into the probe 16 and then delivers the sample to the conduit 22, from which the sample is discharged into a cup 26 in the reactor 24. The reactor 24, illustrated as a tray-like conveyor carrying reaction cups, typically incrementally rotates to dispose a fresh cup under the output end of conduit 22 each time the conveyor 14 incrementally advances. Hence each sample is delivered to a separate cup of the reactor. Further processing or treating of the samples in the reactor 24 and the removal of them from the reactor as well as the reactor construction, can be done with conventional techniques and accordingly are not described further.

The probe 16 forms a hollow tube between an opening at an inlet end 16a and a further opening at an outlet end 16b, to which the conduit 22 is attached. The conduit connects to the probe outlet end with a coupling section 22a that is sufficiently flexible to allow the probe to move relative to the reset of the conduit. Downstream on the illustrated conduit from the coupling section 22a is a metering section 22b along which are positioned two fluid sensors 28 and 30. Each sensor can, for example, employ a conductivity cell or a photosensitive detector, and produces a known change in its output signal when the fluid in the conduit at the point which the sensor is monitoring changes from air to the sample liquid. The sensor 28 is located at a distance along the conduit from the probe inlet end 16a such that the leading edge of a sample being aspirated arrives at the point which the sensor is monitoring when the desired volume of sample has been aspirated.

The resultant output signal from the sensor 28 actuates a control unit 32 to stop the aspiration of sample. This is effected by moving the probe 16 upward, thereby withdrawing it from the container 12. The illustrated sampler 18 then immediately commences introducing a liquid diluent, from a reservoir 34, into the probe 16 by way of the inlet end opening. Thus, as the sampler introduces diluent into the probe 16 and delivers it to the conduit 22, the leading edge of the sample in the conduit 22 progresses from the sensor 28 downstream toward the sensor 30. This sensor is located along the conduit such that it senses the leading edge of the sample at the point when the desired volume of diluent has been aspirated. The control unit 32 responds to the resultant output signal from the sensor 30 to operate the sampler 18 to discontinue taking in further diluent. Thereafter, as the pump 20 draws the aspirated sample and diluent further down the conduit 22 for discharge into the reactor 24, the sampler draws air into the probe.

Figures 2, 6:
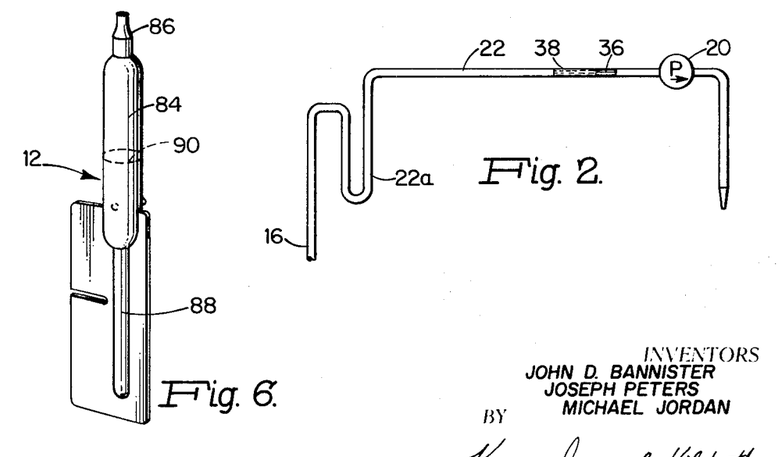
FIG. 2 is a simplified showing of a liquid sample and diluent segment in the conduit of the sampler of FIG. 1.
FIG. 6 shows a liquid-bearing vessel for use with the sampler in accordance with further features of this invention.

FIG. 2 shows the arrangement of fluids which the sampler 18 thus delivers to the conduit 22. As shown, the conduit 22 and probe 16 contain air, or other selected gas, along their entire lengths except for the presence of the metered sample 36 and the metered diluent 38 contiguously behind the sample 36. In the illustrated operation, no air or other gas is aspirated either during the time the sampler is aspirating the sample 36 or the diluent 38 or is moving between the positions for aspirating these two liquids. Hence there is no gas present in these liquids or between them, as indicated in FIG. 2. The sampler can, on the other hand, introduce a gas with either liquid or between the two liquids 36 and 38.

A valve 33 can be provided to occlude the conduit 22 selectively in response to signals from the control unit 32. One purpose of the valve is to control the introductions of air into the probe 16 between the sample liquid and the diluent. For example, in one operating sequence, the control unit 32 closes the valve 33, to occlude the conduit, during the interval between the termination of sample aspiration and the start of diluent aspiration. This ensures that no air is aspirated during this interval. However, as will become apparent hereinafter, the sampler can, at least for some applications, be constructed to move the probe 16 from the sample-aspirating position to the diluent-aspirating position sufficiently fast, so that when operating with a relatively slowly-pumping pump 20, no air is aspirated even when the valve 33 is omitted, i.e. the conduit 22 is left unobstructed. It is considered preferable to locate the valve 33 along the conduit 22 closely downstream from the sensors 28 and 30, i.e. from the length of conduit in which the aspirated fluids are metered.

FIG. 1 also shows a diluent pump 40 connected in the conduit 42 leading from the diluent reservoir 34 to a probe-bathing fluid container 44 in the sampler. In addition, a metering valve 46 is in the conduit 42, closely adjacent the entry thereof into the container 44, for selectively metering the flow rate of the diluent into the container 44. A solenoid-actuated valve 48 selectively turns the diluent flow to the container 44 on and off and accordingly is connected in the conduit 42 with the actuating solenoid thereof connected to the control unit 32. With this arrangement, when the valve 48 is open and the pump 40 is on, the metering valve 46 admits a regulated flow of diluent into the container 44 from the reservoir 34. Alternatively, the solenoid valve 48 can be omitted and the pump 40 turned selectively on and off by way of the control unit 32 to control the diluent flow.

With further reference to FIG. 1, a solenoid 50 moves the probe 16 between the aspirating position where the probe inlet end 16a is immersed within a container 12 and a bathing position where the probe is retracted upward to dispose the inlet end within the container 44. The solenoid winding 50a is connected to be energized from the control unit 32 and when energized moves the solenoid core 50b upward to the position shown, where the probe is in the bathing position. The probe 16 is affixed at its upper outlet end 16b to the lower end of the solenoid core 50b for lineal reciprocation with the core, which is oriented vertically, in line with the probe. When the solenoid 50 is not energized, the core and probe 16 descend to the lower, aspirating, position of the probe. A stop, illustrated as an annular ring 50c secured on the solenoid core 50b, limits this downward movement of the core and probe, and a similar annular ring stop 50d can be provided to limit the upward movement of the solenoid core and hence of the probe.

The assembly 51 of the solenoid core 50b and probe 16 also carries a horizontally-projecting shelf 52 above the fluid container 44. In addition, a further latching solenoid 54, with a winding 54a connected to be selectively energized from the control unit 32, carries a platform member 56 on the solenoid core 54b. When not energized, the solenoid 54 projects the platform member 56 below the shelf 52 when the probe is in its upper position (solenoid 50 energized) and in the path of the shelf to limit the descent of the probe 16. Thus, when the latching solenoid 54 is not energized at the time the main solenoid 50 is de-energized, the platform member 56 engages the underside of shelf 52 on the descending assembly 51 and holds the probe in an intermediate position where the inlet end 16a is in the space between the container 44 and the sample containers 12, i.e. is in air. With the pump 20 still on, the probe aspirates air into the conduit 22 while in this position. The subsequent energizing of solenoid 54 draws the solenoid core 54b to the left in FIG. 1, i.e. into the core 54a, and thereby withdraws the platform member 56 out from under the shelf 52. The core and probe assembly 51 is then free to descent to the lower aspirating position.

The solenoid 54 is illustrated with stops to limit the travel of the solenoid core 54b in a manner similar to the arrangement of solenoid 50. Further, a spring 57 on the solenoid 54 is compressed when the solenoid is energized to retract the core 54b, and hence moves the core 54b to the desired projected position when the solenoid is not energized. The weight of the core-probe assembly 51 is generally sufficient to lower it when solenoid 50 is not energized, and hence this solenoid generally does not require a spring or like device. However, where desired, a spring or like device can be provided to urge the assembly 51 downward, either by pushing upward against the solenoid winding 50a or by pulling downward toward the container 44.

Thus the solenoids 50 and 54, switched on and off by the control unit 32 and with associated stops and springs or the like, operate as lineal actuating means to position the probe 16 in any one of three positions, an upper bathing position, an intermediate position and a lower sampling position. Further, the probe moves between these three positions with a simple lineal reciprocation.

The sampler 18 has a further pump 58 connected to pump fluid out of two outlet passages 62 and 64 leading from the bathing container 44. The operation of the pump 58 in connection with the bathing container 44, and the construction of the bathing container, will now be described with reference to FIGS. 3, 4 and 5, which respectively show the sampler in the upper bathing position, the intermediate position, and the lower sampling position.

Figure 3:
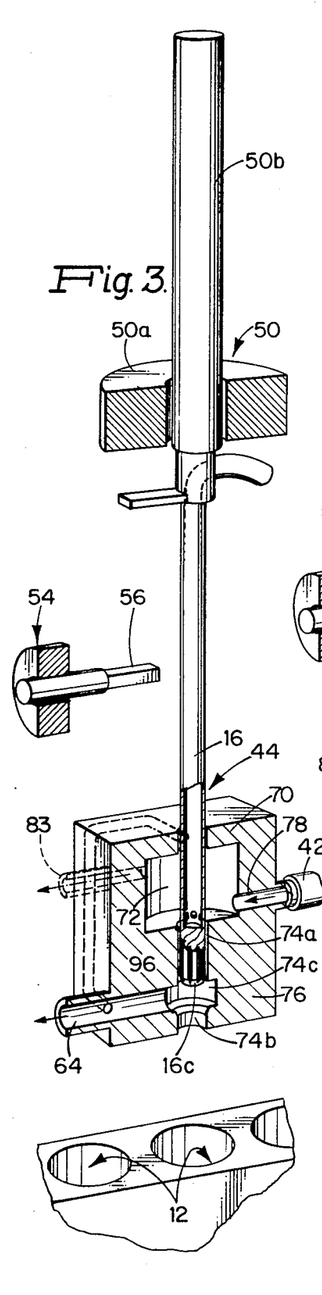
FIGS. 3, 4 and 5 are enlarged fragmentary views of the sampler of FIG. 1 showing different operative positions of the sampler.
Figures 4, 5:
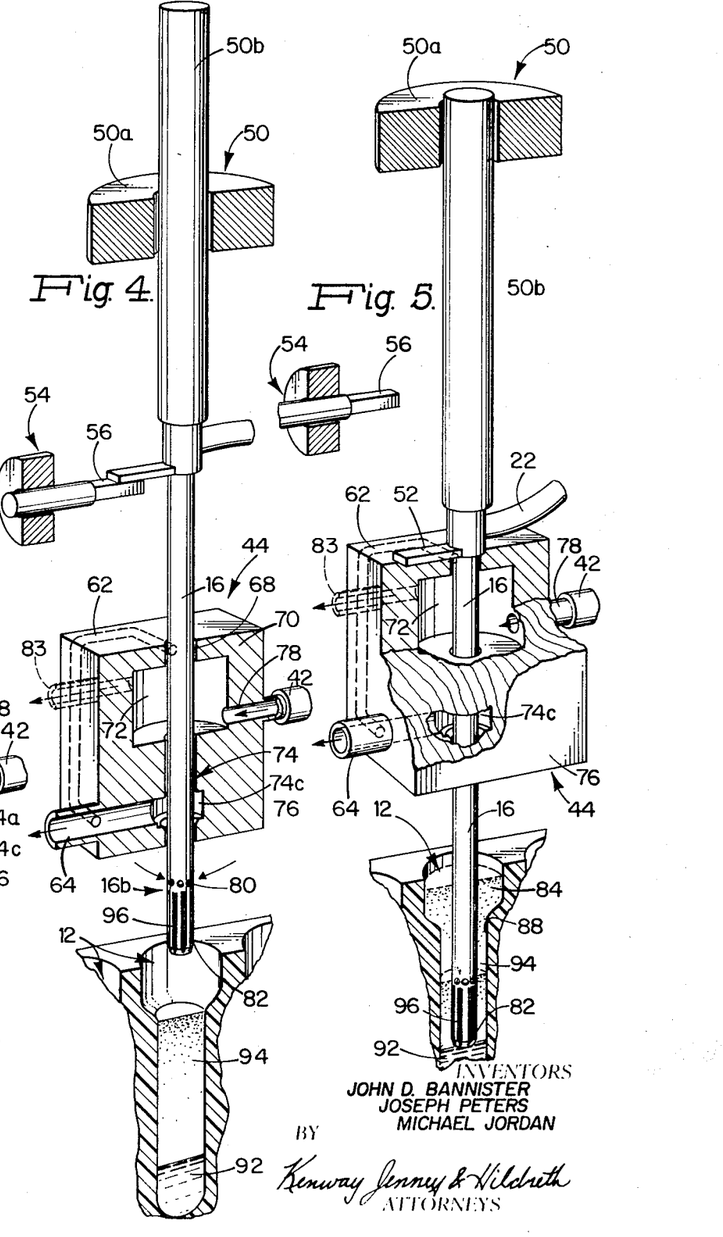

With reference to these FIGS. 3, 4 and 5, the probe-bathing container 44 has two in-line passages 68 and 74 through which the probe 16 can slidably pass. The upper slide passage 68 extends through an upper container wall 70 and feeds into the top of an inner bathing chamber 72 of the container. Opposite the upper slide passage, the lower slide passage 74 feeds out of the chamber 72 through a lower container wall 76 to the bottom of the container 44. The slide passages 68 and 74 are coaxial with the probe 16 and the chamber 72 is substantially centered on this common axis. Thus the successive arrangement of slide passage 68, bathing chamber 72 and slide passage 74 form a passageway vertically through the container 44. The probe 16 can pass through the container within this passageway and can longitudinally slide relative to it.

The bathing chamber 72 is considerably larger in cross-section than the probe 16 to form an elongated annular space encircling the probe. A fluid inlet passage 78 feeds into the bathing chamber and is connected to conduit 42 for feeding diluent from reservoir 34 (FIG. 1) to the chamber.

The upper slide passage 68 is a tubular, neck-like opening closely spaced about the probe 16 to pass the probe freely therethrough but with little clearance therebetween. Hence the slide passage 68 is dimensioned relative to the probe 16 to restrict the flow of fluid through the passage 68 around the outside of the probe. The fluid outlet passage 62 leads from the upper slide passage 68, as shown.

The lower slide passage 74 has restricted tubular neck portions 74a and 74b at the ends thereof, i.e. the passage 74 feeds into the bathing chamber 72 through an upper neck portion 74a and passes to the outside of the container 44 through a lower neck portion 74b. Intermediate these neck portions, the slide passage 74 has a radially-enlarged tubular scavenging portion 74c. Each neck portion is dimensional like the upper slide passage 68 to have a cross section closely spaced about the probe and thereby to pass the probe freely therethrough, but without excessive clearance between the probe and the tubular surface of the neck portion. Thus, when the probe is in a neck portion of passage 74, there is only a restricted space where fluid can pass through the neck portion around the outside of the probe.

The scavenging portion 74c of passage 74 has a larger cross section than the neck portions to form a tubular, scavenging chamber, space, about whatever portion of the probe which is in this passage portion. Also, the fluid outlet passage 64 leads from the scavenging portion of passage 74. As noted above with reference to FIG. 1, this outlet passage, and the outlet passage 62, are connected to the vacuum pump 58. As shown in FIGS. 3, 4 and 5, in the illustrated container 44 the outlet passage 68 is narrower than passage 64 and passes within the container 44 walls to feed into the passage 64, which then connects to the vacuum pump 58.

As further shown in FIGS. 3, 4 and 5, the illustrated probe 16 is a straight vertically-disposed tube hollow between inlet holes 80 in the probe inlet end 16a and the connection to conduit 22 at the probe outlet end 16b. Further in accordance with the invention, the probe inlet holes 80 are circumferentially spaced about the probe side wall a short distance above the lower end 16c of the probe, and a closed plug 82 extends on the probe inlet end from just below the inlet holes to the plug end 16c.

The plug substantially blocks the passage neck portion 74a when the probe is raised to the upper, bathing position, and hence restricts fluid from passing therethrough. For this operation, the plug preferably is slightly longer than the passage 74 neck portion 74a so that when, as shown in FIG. 3, the probe is in the bathing position, the inlet holes 80 at the top of the plug are within the bathing chamber 72 and the probe end 16c is at the juncture between the passage neck portion 74a and the scavenging chamber portion 74c. However, significant blockage of the neck portion 74a will result even when the plug is shorter than this passage portion. On the other hand, the plug is sufficiently short so that it does not enter the lower passage neck portion 74b when the probe is raised to the bathing position.

In the following operating sequence of the sampler, the proportional pump 20, diluent pump 40 and vacuum pump 58, all shown in FIG. 1, operate continuously. This however is not required, and these devices can, alternatively, be turned on and off within the scope of this invention.

When the sampler 18 is in the intermediate, air aspirating position shown in FIG. 4, the solenoid 50 is not energized, so that the assembly 51 of the solenoid core 54b and probe 16 are free to drop. However, the solenoid 54 also is not energized and hence disposes the platform member 56 under the shelf 52, thereby holding the probe in the intermediate position. In this position, the probe inlet end 16b is below and hence outside the bathing container 44 but is above the sample containers 12. Accordingly, the suction created by the pump 50 draws ambient air into the probe through the inlet holes 80. The air is drawn through the conduit 22 and discharges from its outlet end, adjacent reactor 24.

During this time, the diluent control valve 48 is closed to block the delivery of diluent to the container 44. Hence no diluent is delivered to the container bathing chamber 72. Further, the vacuum pump 58 is on and draws fluid into both container outlet passages 62 and 64. The fluid being drawn off through the outlet passages is air which is drawn in from outside the container 44 by way of slide passage 68 and slide passage neck portion 74b. This flow of air into the outlet passage 62 and 64 scavenges away any liquid present in slide passage 68 and in passage portion 74b and 74c. Hence this flow of ambient air into the container 44 and out via the outlet passages 62 and 64 seals liquid from leaking out from the container at the slide passages 68 and 74.

To place the sampler in the sampling position, FIG. 5, the control unit 32 maintains the solenoid 50 deenergized and the diluent valve 48 closed, as during the preceeding, air aspirating, operation; but energizes the latching solenoid 54. Upon being energized, the solenoid 54 withdraws the platform member 56 from being below the shelf 52. Accordingly the probe 16 descends and the probe inlet end enters a container 12 and immerses in the sample liquid therein. The continued operation of pump 20 draws the sample liquid into the probe and on to the conduit 22. When the leading edge of the sample arrives at the liquid sensor 28, this sensor applies a signal to the control unit 32 indicating that the desired volume of sample liquid has been aspirated.

In response, the control unit 32 both energizes the solenoid 50 and opens the diluent valve 48. The energized solenoid 50 quickly raises the sampler probe from the sampling position of FIG. 5 to the raised bathing position shown in FIG. 3 and the open diluent valve 48 delivers diluent to the bathing chamber 72. As described above, the control unit 32 can close the valve 33 during the probe-raising time to preclude the aspiration of air. Otherwise, the valve 33 typically remains open.

In the raised position, the probe inlet end 16b is partly in the bathing chamber 72 and partly in the slide passage 74. Specifically, the probe inlet holes 80 and the length of probe above them which was immersed in the sample during the preceding sample aspirating operation are in the bathing chamber, and the probe plug 82 is largely in the passage neck portion 74a.

The opening of diluent-controlling valve 48 admits diluent to the bathing chamber 72. There is already a partial vacuum in this chamber by virtue of the lower-than-ambient pressure which the vacuum pump 58 applies to both passages 68 and 74 by way of the fluid outlet passages 62 and 64. Accordingly, the chamber 72 commences filling with diluent liquid just prior to the entry of the probe inlet holes 80 therein, and whatever air was in the chamber is quickly drawn out through the outlet passages 62 and 64.

The continued operation of the proportional pump 20 causes the probe to draw in diluent from the chamber 72 and feed it to the conduit 22 directly behind the just-aspirated sample. The flow of diluent within the bathing chamber, due both to the aspiration of diluent into the probe and to the metered delivery of diluent to the chamber as controlled with the metering valve 46, washes the outer surfaces of the probe inlet end clean of the sample into which the probe was just immersed.

Further, the metering valve 46 delivers diluent to the bathing chamber at a rate faster than that at which the probe aspirates the diluent. The vacuum pump 58 draws the excess diluent in the chamber down the passage portion 74a and into the outlet passage 64. This flow of excess diluent from the bathing chamber to the outlet passage 64 washes the remaining traces of the sample just aspirated from the probe plug 82.

Thus, when the sampler probe is in the raised position, there is a mixed swirling flow of diluent descending from the bathing chamber 72 and of air being sucked upward through the passage neck portion 74b is in the scavenging section 74c. Both fluids are sucked into the outlet passage 64, so that no diluent leaks out of the bottom of the container 44. Diluent from the bathing chamber 72 also enters the upper passage 68, from which it is likewise scavenged into the outlet passage 62. The rate at which diluent flows out of the bathing chamber 72 into the passages 68 and 74 can be controlled with conventional techniques, as by controlling the rate of diluent delivery to the chamber, the rate of diluent aspiration into the probe, and by the selection of the vacuum pump 58 and of the flow spaces in container 44 leading to this pump.

Further, the entries of the two outlet passages 62 and 64 into the slide passages 68 and 74 above and below the bathing chamber 72 tend to maintain a pressure balance across the body of liquid in the chamber 72. This pressure balance facilitates controlling the flow of diluent from the bathing chamber 72 into the passages 68 and 74 to ensure thorough probe cleansing without leakage of the diluent out of the container.

It will also be realized that the flow of diluent into the probe along the same path through which samples are aspirated cleanses the interior of the probe and the interior of the conduit 22 to prevent inter-sample contamination.

This bathing operation shown in FIG. 3, which in the illustrated sampler is both a probe and conduit cleansing operation and a diluent aspirating operation, continues until the liquid sensor 30 detects the arrival of the leading edge of the aspirated sample, which is being followed by the diluent, in the conduit 22. The resultant signal from sensor 30 actuates the control unit 32 to deenergize the solenoid 50, thereby allowing the probe to descent out of the bathing chamber and container 44, and thereby essentially immediately ceasing the aspiration of diluent into the probe.

Further in accordance with the illustrate operating sequence, the latching solenoid 54 is already deenergized at this time and hence is projecting the platform member 56 in the path of the shelf 52. Therefore, the probe 16 descends only to the intermediate, air-aspirating, position. The latching solenoid preferably is deenergized as soon as the solenoid 50 raises the probe to the upper, bathing position, and this can readily be effected by means of a switch which is actuated by the arrival of the core-probe assembly 51 in the raised position.

Essentially simultaneous with the deenergizing of solenoid 50 in response to the sensor 30 signal, the control unit 32 closes valve 48, thereby stopping the delivery of diluent to the bathing chamber 72.

When the solenoid 50 is deenergized and the diluent valve 48 closed at the end of the bathing operation as described above as the probe 16 descends to the intermediate, air-aspirating position of FIG. 5, the air-scavenging flow around the probe as it passes down through the scavenging chamber 74c wipes the probe outer surfaces dry of diluent. As a result, the probe 60 descends out of the container 44 to the intermediate position with the outer surfaces thereof free of at least droplets of diluent and in most instances essentially completely dry of diluent. The continued application of reduced pressure to the container 44 slide passages 68, 74 by way of the outlet passages 62 and 64 carries away any diluent remaining in the container 44, without any of it leaking out of the container.

Alternative to the preceding sequence for completing the probe bathing operation, the valve 48 can be closed prior to the deenergizing of the solenoid 50. The probe will then aspirate the diluent which is in the bathing chamber, and then aspirate air. Illustrative of a further operation, the pump 20 can be stopped to limit the amount of diluent which is aspirated into the probe.

At this juncture, the sampler has completed one operating sequence. Typically, during the time that the sampler is in the bathing and air-aspirating positions, the conveyor 14 advances another container 12 of sample into position under the probe and the operating sequence repeats in the manner described herein above.

FIGS. 3, 4 and 5 show one alternative construction for the bathing chamber 44 whereby a diluent outlet 83 from the bathing chamber 72 is provided. With this outlet, shown with dashed lines, a relatively large flow of diluent can pass through the chamber, or air can be evacuated from, or even delivered to, the chamber more rapidly than otherwise, for different operations as may become desirable.

In accordance with a further feature of the invention, FIG. 6 shows a preferred sample container 12 for use with the sampler 18 having the plug-ended probe 16. The container 12 is of the squeeze bulb type with a collapsible and resiliently-restoring liquid storage bulb 84 into which sample liquid can be aspirated through an inlet nozzle 86. A hollow, elongated tubular compartment 88 depends from the bulb 84, which is illustrated as also being tubular and in line with the compartment 88 but of significantly larger internal cross-sectional area and storage volume than the compartment. The commonly assigned and copending U.S. patent application Serial No. 105,930 for "Container Unit For Liquid Samples" filed concurrently with this application in the names of W. G. Perry and J. F. Marten describes a container construction of this type in detail.

With this construction, the denser constituents and any solid material in a sample within the container 12 settle to the bottom of the bulb 84 and thence into the tubular compartment 88. The liquid or other less dense portion of the sample material is then above the denser material, i.e., is in the upper end of the tubular compartment 88 and, depending on the volume of material aspirated, in the bulb 84.

A specific example of the use of the container 12 is when the sample material is blood and it is desired to analyze the serum free of the red blood cells. The blood is aspirated into a container 12 as shown in FIG. 6 and the nozzle 86 sealed, and then the entire container is centrifuged to pack the red blood cells into the lower end of the tubular compartment 88 below the serum. The container is then opened to expose the bulb interior and tubular compartment, typically by severing the bulb 84 transversely along line 90 to leave a sample cup as shown in FIGS. 3, 4, and 5 intact.

This fragment of the container is fed to the sampler 18, which aspirates sample liquid, e.g., serum, from it in the manner now described with reference to FIG. 5.

When operating with the preferred container 12 shown, in the sampling position of the sampler 18, the probe 16 descends to dispose the bottom of plug 82 closely above the top of the column 92 of packed red blood cells in the tubular compartment 88. The compartment 88 has an inner cross section just slightly larger than the probe 16 so that the probe end freely passes into the tubular compartment 88. However, the volume of the probe plug is sufficiently large relative to the capacity of the length of compartment 88 in which it extends, so that the probe plug 82 displaces the serum 94 upward in the tubular compartment 88 and into the bulb 84.

This displacement of the serum or other liquid portion of the sample away from the sediment below it is highly desirably because it enables the sampler probe to aspirate this liquid with little likelihood of aspirating the red blood cells or other denser material. In particular, the probe 16 aspirates sample by way of the probe inlet holes 80. However, they extend through the probe side-wall immediately above the plug 82, and hence are displaced far above the column 92 of packed red cells. As a result, the flow of liquid within the container 12 into the probe does not disturb the sedimented red cells. Further, the plug-ended probe 16 can aspirate nearly all the serum from the container 12, because only the minute amount of serum surrounding the plug 82 is inaccessible to the probe.

In effect then, the provision of the probe plug 82 in conjunction with the sample container 12, having a probe-receiving lower tubular compartment, greatly diminishes the volume of liquid at the interface between the liquid and the red blood cells or other dense material below it in the container 12. By way of specific illustrative example, in one embodiment of the invention, the container compartment 88 interior is 1.81 inches long and is generally cylindrical with a diameter of 0.13 inches, and the probe outer diameter is around 0.09 inches and the probe plug is about 0.19 inches in length.

The illustrated probe plug 82 has a preferred configuration on the outer tubular surface in that it is recessed with axially-extending grooves 96. These grooves provide additional passageways for sample liquid in the container compartment 88 to flow upward around the plug as it descends into the compartment 88. This is desirable because it reduces the turbulence of this flow of liquid away from underneath the descending plug, and hence reduces the likelihood that the red cells or other sediment in the lower end of the compartment will be disturbed and then aspirated into the probe.

Referring again to FIGS. 1 and 5, the sampler 18 can be constructed to dispose the probe 16 in the sampling position with the probe bottom 16c automatically resting on the red cell column 92 or other sediment. This will enable a maximum volume of sample liquid to be aspirated from each sample container automatically, independent of the height of the sediment therein. With the illustrated construction for providing this automatic level-seeking descent of the probe 16, a dash-pot mechanism 98 is affixed to the upper end of solenoid core 50b to retard the probe descent from the intermediate position. The mechanism has a fixed three-section cylinder 100 having a closed bottom and within which slides a piston 102 that is secured to the core 50b by a rod that passes thru the cylinder bottom with a sliding side. The cylinder top section 100a is openly vented, and a hole 104 openly vents the middle section 100b. However, a one-way check-valve 16 releases air from the cylinder lower section 100c slowly, but admits air into it freely.

With this construction, the piston moves upward within the cylinder freely. Also, it descends freely through the middle section to the level of the hole 104, which is adjacent the piston when the probe is in the intermediate position. However, in order for the probe to descend further, the air in the cylinder lower section must vent out through the check-valve 106, and it provides a sufficient restriction to slow the descend as needed to allow the probe bottom to rest upon the top of the sediment column 92 in the container compartment 88.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense. As one such change, the sampler probe can be curved and move along a curved path, rather than in a straight line as illustrated.

Also, actuators other than solenoids, e.g. pneumatic actuators, can be used to control the positioning of the probe.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Liquid sampling equipment in which an aspirating end of a liquid-aspirating probe is immersed successively in sequentially ordered containers for the removal of a liquid sample from each container and in which the materials in at least some of the containers includes both the liquids to be sampled and material denser than said liquids, the improvement wherein A. each sample container has a tubular compartment forming the bottom thereof and with a volume larger than the volume of said denser material likely to be in any sample container, B. said probe has a closed plug secured to the aspirating end thereof and elongating said probe beyond the probe aperture through which said probe aspirates said liquid samples, and said probe fits within said container tubular compartments, and C. probe positioning means extends said probe into each said sample container to dispose said plug within said tubular compartment thereof.

2. The improvement in liquid sampling equipment as defined in claim 1 further characterized in that A. each sample container has said tubular compartment thereof depending from a further compartment having a cross section larger than the cross section of said tubular compartment thereof.

3. The improvement in liquid sampling equipment as defined in claim 1 further characterized in that A. said tubular compartment of each sample container has a volume larger than the sum of the volumes of said denser material likely to be in any sample container plus the volume of said probe plug, and B. said probe positioning means extends said probe into each sample container to dispose said plug substantially entirely within said tubular compartment thereof.

4. Liquid transfer apparatus for successively transferring a sample of liquid between each of plural liquid vessels and a conduit, said apparatus comprising A. probe-bathing means
 1. having a fluid chamber,
 2. having a first slide passage section communicating with said chamber and extending therefrom to a passage first end spaced from said chamber,
 3. having a fluid inlet passage for the delivery of fluid to said chamber,
 4. having a fluid outlet passage feeding from said first slide passage section, intermediate said passage first end and the entry of said first passage section into said chamber, for the removal of fluid from said first passage section, B. probe means
 1. having a first fluid-passing aperture therethrough for communicating with said vessels and a second fluid-passing aperture therethrough removed from said first aperture and for communicating with said conduit, and having a fluid passage therein between said apertures thereof, and having a first end spaced from said first aperture thereof in the direction away from said second aperture thereof and having a closed end plug section forming the length thereof between said first end and first aperture thereof,
 2. slidable within said first passage section and reciprocatable relative to said bathing means and within said first passage section between at least a first rest position where said first aperture is disposed in said chamber and a second position where said first aperture is outside said passage first end on the side thereof removed from said chamber for immersion in one said liquid vessel, C. probe-position control means for controlling movement of said probe means selectively to said first position and to said second position, D. liquid delivery means coupled with said fluid inlet passage for the delivery of liquid to said chamber, and E. pressure means coupled with said fluid outlet passage for the removal therethrough of fluid from said first slide passage section.

5. Liquid transfer apparatus as defined in claim 4 in which said probe-position control means includes means for controlling the movement of said probe means from said first position to said second position such that said probe comes to rest in said second position when said end plug section thereof abuts against substantially solid material within one said liquid vessel.

6. Liquid sampling apparatus for successively withdrawing into a conduit a sample of liquid from each of plural liquid vessels, said apparatus comprising A. a fluid container having
 1. walls forming a fluid-containing bathing chamber therein,
 2. first and second tubular-bored slide passages extending on opposite sides from said first chamber with the bores thereof communicating with the chamber interior and disposed in line with each other, said first slide passage having end portions with said bore therethrough closely fitting about said probe and having a tubular bore therebetween significantly larger than said probe,
 3. a fluid inlet passage feeding into said chamber for the delivery of fluid thereto,
 4. a first fluid outlet passage feeding from said first slide passage for the removal of fluid therefrom, B. a tubular probe
 1. elongated between first and second fluid-passing apertures,
 2. extending within said fluid container slidably seated at least in said second slide passage with said second aperture thereof outside said second slide passage, and
 3. slidable relative to said first container between a first position where said first aperture is within said chamber and a second position where said first aperture is outside said first slide passage, and
 4. a closed plug secured thereto adjacent said first aperture and further elongating said probe beyond said first aperture in the direction away from said second aperture, C. probe-position control means selectively operable for controlling the positioning of said probe in either of said first and second positions, for seating said probe plug at least in said first slide passage end portion adjacent said chamber when said probe is in said first position, for restricting the passage of fluid about said probe between said chamber and said first slide passage.

D. liquid delivery means coupled with said fluid inlet passage for the selective delivery of liquid to said chamber by way of said inlet passage, and E. pressure means coupled with said fluid outlet passage for exhausting fluid therethrough from said first slide passage.

7. Liquid transfer apparatus for successively transferring a sample of liquid between each of plural liquid vessels and a conduit, said apparatus comprising A. probe-bathing means including a probe-bathing fluid container
 1. having an inner bathing chamber 2. having a lower slide passage section below and communicating with said bathing chamber and extending therefrom to a passage first end spaced from said bathing chamber,
3. having a fluid inlet passage for the delivery of fluid to said chamber,
4. having a fluid outlet passage communicating with said lower slide passage section, intermediate said passage first end and the entry of said lower slide passage section into said chamber, for the removal of fluid from said lower slide passage section,
5. having an upper slide passage section above and communicating with said bathing chamber, said upper slide passage being substantially centered on an axis common with said lower slide passage, said upper and lower slide passages having a bore-like configuration, the diameter of which is smaller than the diameter of said bathing chamber,
6. having a further fluid outlet passage feeding from said upper slide passage section for the removal of fluid therefrom.

B. probe means
1. having a first fluid-passing aperture therethrough for communicating with said vessels and a second fluid-passing aperture therethrough removed from said first aperture and for communicating with said conduit, and having a fluid passage therein between said apertures thereof,
2. slidable within said lower passage section and reciprocatable relative to said bathing means and within said lower passage section between at least a first rest position where said first aperture is disposed in said chamber and a second position where said first aperture is outside said passage first end on the side thereof removed from said chamber for immersion in one said liquid vessel, C. probe-position control means for controlling movement of said probe means selectively to said first position and to said second position, D. liquid delivery means coupled with said fluid inlet passage for the delivery of liquid to said chamber, and E. pressure means coupled with said fluid outlet passage for the removal therethrough of fluid from said lower slide passage section.

8. Liquid transfer apparatus as defined in claim 7 in which said probe means is slidably received in said upper passage section both when in said first position and when in said second position.

9. Liquid transfer apparatus as defined in claim 7 in which said probe means is slidably received in said upper slide passage section and protrudes therefrom beyond said passage second end to dispose said second aperture thereof outside said bathing means.

10. Liquid transfer apparatus as defined in claim 7
A. in which said probe means is slidably seated at least partially in said lower slide passage section throughout the reciprocation thereof to said first and second positions,
B. in which said chamber has a volume significantly larger than the volume of said probe means disposed therein,
C. in which said lower slide passage section has first, second and third portions arranged in succession between said chamber and said slide passage first end,
1. said first passage portion closely fitting about said probe means for restricting passage of fluid therethrough about the outside of said probe means,
2. said third slide passage portion closely fitting about said probe means for restricting passage of fluid therethrough about the outside of said probe means, and
3. said second slide passage portion having said fluid outlet passage feeding therefrom and having a cross sectional shape significantly larger than that of either of said first and second passage portions for forming an annular chamber about said probe means when disposed therein, 11. Liquid transfer apparatus as defined in claim 7 further comprising sequencing means for operation with said control means to dispose said probe means sequentially in said second position, move said probe means to said first position, and then remove said probe means from said first position in a direction towards said second position.

12. Liquid sampling apparatus for successively withdrawing into a conduit a sample of liquid from each of plural liquid vessels, said apparatus comprising
A. a fluid container having
1. walls forming a fluid-containing bathing chamber therein,
2. lower and upper tubular-bored slide passages extending on opposite sides from said first chamber with the bores thereof communicating with the chamber interior and disposed in line with each other,
3. a fluid inlet passage feeding into said chamber for the delivery of fluid thereto,
4. fluid withdrawing means in communication with said upper and lower slide passages for withdrawing fluid therefrom and for maintaining selectively related pressures above and below said fluid-containing bathing chamber, both of which are not greater than the pressure within said fluid-containing bathing chamber,
5. a tubular scavenging portion formed within said lower slide passage, said scavenging portion being an annular chamber with a cross sectional shape larger than the remainder of said lower slide passage, B. a tubular probe
1. elongated between first and second fluid-passing apertures,
2. extending within said fluid container slidably seated at least in said upper slide passage with said second aperture thereof outside said upper slide passage, and
3. slidable relative to said fluid container between a first position where said first aperture is within said chamber and a second position where said first aperture is outside said lower slide passage, C. probe-position control means selectively operable for controlling the positioning of said probe in either of said first and second positions, D. liquid delivery means coupled with said fluid inlet passage for the selective delivery of liquid to said chamber by way of said inlet passage, and E. pressure means coupled with said fluid outlet passage for exhausting fluid therethrough from said lower slide passage.

13. Liquid sampling apparatus as defined in claim 12, in which said fluid withdrawing means includes fluid outlet passages each with an inner end thereof feeding from said upper or lower slide passage, and coupled with said pressure means.

14. Liquid sampling apparatus as defined in claim 12 in which said fluid container further has a liquid drain passage feeding out from said chamber for the removal of fluid therefrom.

15. Liquid sampling apparatus as defined in claim 12 further comprising fluid pumping means coupled to said probe second aperture for aspirating fluid into said probe at said first aperture thereof.

16. Liquid transfer apparatus for successively transferring a sample of liquid between each of plural liquid vessels and a conduit, said apparatus comprising A. probe-bathing means
  1. having a fluid chamber,
  2. having a lower slide passage section communicating with said chamber and extending therefrom to a passage first end spaced from said chamber,
  3. having a fluid inlet passage feeding into said chamber for the delivery of fluid thereto,
  4. having fluid withdrawing means coupled with said lower slide passage for maintaining therein a pressure not greater than the pressure within said fluid chamber and lower than the pressure at said passage first end, and for maintaining selectively related pressures above and below said fluid chamber, both of which are not greater than the pressure within said chamber, B. probe means
  1. having a first fluid-passing aperture therethrough for communicating with said vessels and a second fluid-passing aperture therethrough removed from said first aperture and for communicating with said conduit, and having a fluid passage therein between said apertures thereof,
  2. slidable within said lower passage section and reciprocatable at least partly within said lower passage section relative to said bathing means between at least a first position where said first aperture is disposed in said chamber and a second position where said first aperture is outside said passage first end on the side thereof removed from said chamber for immersion in one said liquid vessel, C. probe-position control means for controlling movement of said probe means selectively to said first position and to said second position, D. liquid delivery means coupled with said fluid inlet passage for the delivery of liquid to said chamber.

* * * * *

UNITED STATES PATENT OFFICE
CERTIFICATE OF CORRECTION

Patent No. 3,719,086  Dated March 6, 1973

Inventor(s) John D. Bannister; Joseph C. Peters; Michael Jordan

It is certified that error appears in the above-identified patent and that said Letters Patent are hereby corrected as shown below:

On the first page of the patent, the addresses of the inventors should be, respectively: --Dover, Mass.; Marlboro, Mass; and South Merrimack, New Hampshire--.

Column 3, line 47, insert --a-- before "sampler".

Column 4, line 3, "reset" should be --rest--.

Column 5, line 66, "descent" should be --descend--.

Column 8, line 27, delete "being".

Column 9, line 18, delete "is" after "74b".

Column 12, line 18, change "16" to --106--.

Column 14, line 39 (subparagraph B3, first line) change "first" to --fluid--.

Signed and sealed this 17th day of September 1974.

(SEAL)
Attest:

McCOY M. GIBSON JR.  C. MARSHALL DANN
Attesting Officer  Commissioner of Patents